June 1, 1937.   K. RABE   2,082,509
SPRINGING ARRANGEMENT
Filed Jan. 10, 1935   2 Sheets-Sheet 1
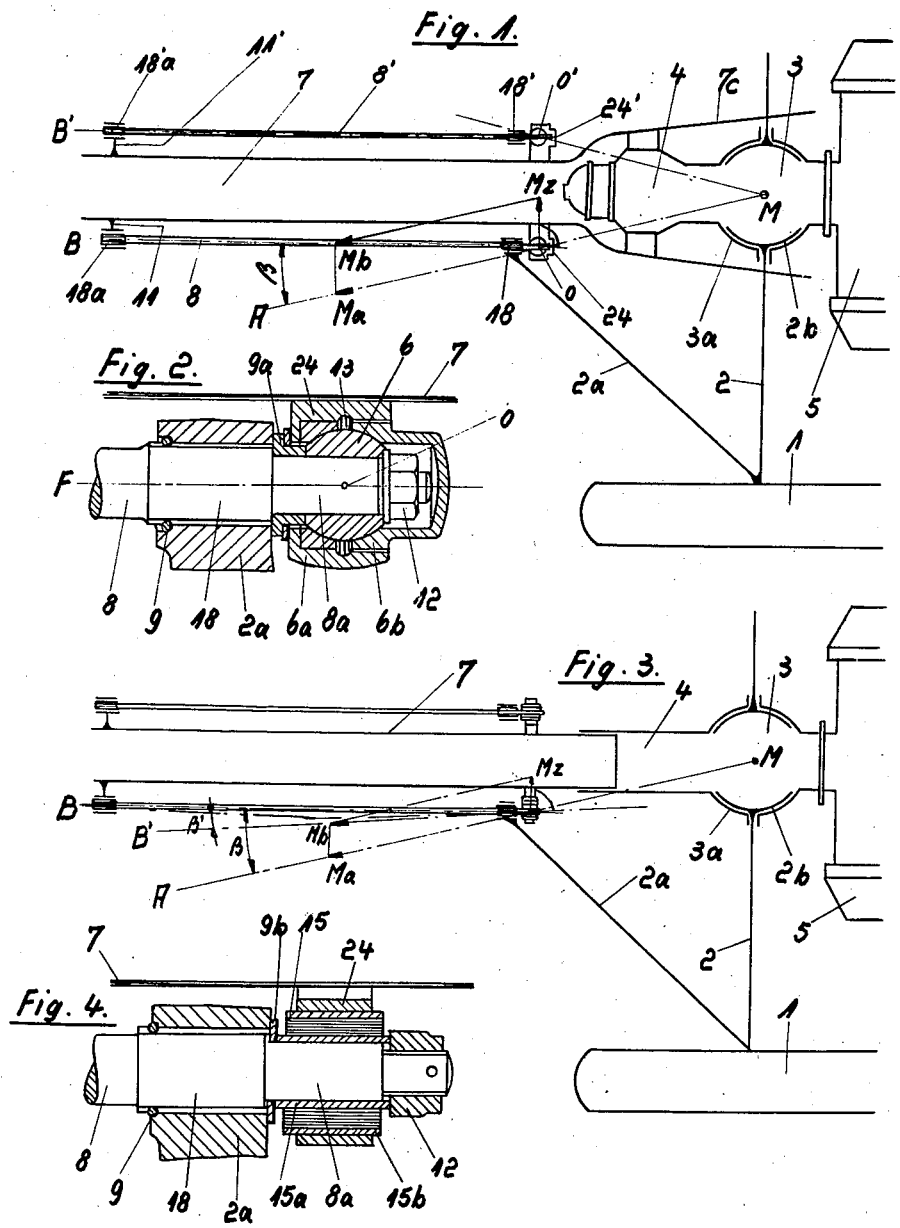
Inventor:
Karl Rabe June 1, 1937.  K. RABE  2,082,509
SPRINGING ARRANGEMENT
Filed Jan. 10, 1935  2 Sheets-Sheet 2

Inventor:
Karl Rabe

Patented June 1, 1937

2,082,509

UNITED STATES PATENT OFFICE 2,082,509

SPRINGING ARRANGEMENT

Karl Rabe, Stuttgart, Germany

Application January 10, 1935, Serial No. 1,224
In Germany January 18, 1934

23 Claims. (Cl. 267—57)

This invention relates to a springing arrangement for wheels mounted on swinging half axles, more particularly for power driven vehicles, using torsion springs which lie outside the axis of oscillation of the wheels.

In the arrangement according to application No. 712,588 filed Feb. 23, 1934 the torsion springs are connected with the swinging struts of the half axles through a universal joint. It has now been found that the interior force moments occurring in this universal joint are without influence on the wheel movement, but not without influence on the wheel springing. These force moments increase especially when the axis of oscillation of the wheel deviates from the axis of rotation of the springs, as compared with the instantaneous value of the restoring moment of the torsion springs in such a manner that the friction moment produced thereby interferes with the recoil.

The novelty of the invention consists in this, that the swinging strut of the half axle is rigidly connected with the torsion spring, and the end of the torsion spring near this connection is mounted on the frame through the intermediary of a ball or rubber joint. This gives the result that the constraint moment occurring as an ineffective component of the restoring moment is resiliently absorbed, and the frictional moment which interferes with the recoil can be suppressed. In this arrangement on account of the constraint moment, the torsional spring is subjected to a further bending stress, but assuming a horizontal strut position in a vertical plane of action. The guiding of the wheels is not substantially affected while the springing of the wheels remains absolutely effective with respect to even the smallest shocks. In addition the arrangement has the advantage that the additional forces due to steering re-actions and to shocks in the direction of travel are resiliently absorbed and therefore can be transmitted to the frame practically without vibration. When a ball joint is used for mounting the swinging strut there is only a simple constraint moment, but when a rubber joint is used, for example in the form of a positively shaped rubber sleeve, there will be at least two contraint moments in different planes, the resultant of which is smaller than in the previous case. The reason for this lies in the fact that the torsion spring, on account of the resilience of the rubber joint, tends to move into the theoretical axis of oscillation of the wheels and therefore assuming a horizontal strut position, and is also capable of taking up a bending moment in a horizontal plane of action. The last mentioned arrangement has been found especially simple and economical.

The arrangement according to the invention is illustrated in two constructional examples, as applied to swinging half axles for a power driven vehicle, which are supported by struts in the forward direction.

Fig. 1 shows a diagrammatic view of the rear part of the vehicle in plan.

Fig. 2 is a corresponding horizontal section through the strut mounting on a larger scale.

Fig. 3 is a view similar to Fig. 1 of a second construction.

Fig. 4 is a corresponding horizontal section through the strut mounting on a larger scale.

Figure 5:
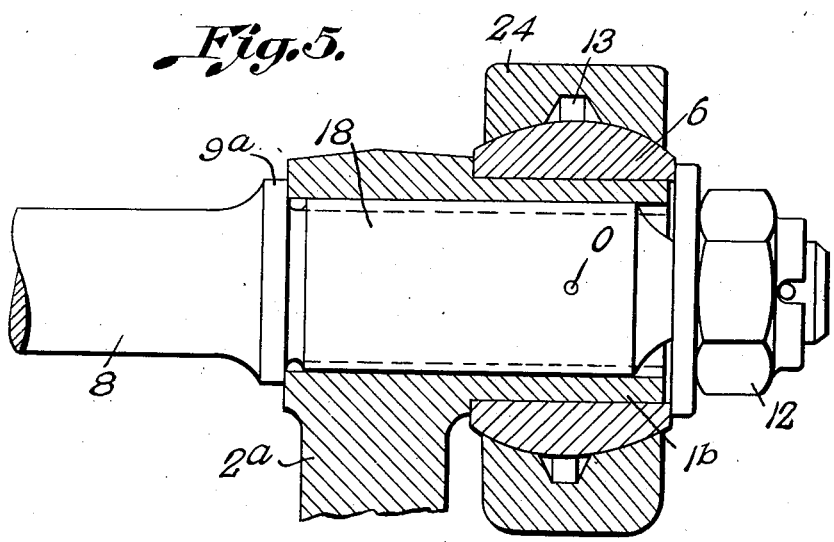
Figs. 5 and 6 are views similar to Figs. 2 and 4 of further modifications.

In the constructional example according to Figs. 1 and 2 a vehicle frame constructed as a central supporting member 7 is provided with a funnel-shaped extension 7c in which is mounted the driving block, comprising the engine 5, axle casing 3 and change speed gear 4. In the cover 3a of the axle casing 3 the axle tube 2 is mounted by means of a spherical shell 2b so as to swing about the middle point M. The axle tube 2 carrying the wheel 1 is rigidly connected with a swinging strut 2a, which is arranged to slope forwards and inwards. The swinging strut 2a is directly connected with a spring bar 8 arranged parallel to the central supporting member 7 by means of a grooved enlargement 18, and is secured thereon against longitudinal displacement by means of an expanding ring 9 and a sleeve 9a. The rear end of the spring bar 8a is connected with a ball 6 by means of a nut 12. The ball 6 rests in corresponding sockets 6a, 6b of a bearing block 24 connected to the supporting member 7. Between the sockets 6a, 6b, a lubricating groove 13 is provided in the bearing block 24. The front end of the spring bar is non-rotatably connected with an abutment 11 of the supporting member 7 by means of a grooved enlargement 18a.

The line of connection of the middle point M of the spherical shell 2b with the middle point O of the ball joint 6 is the theoretical axis of oscillation A of the wheel 1. The axis of rotation B of the spring bar 8 makes an angle $\beta$ with the axis A. If the bearing moment Ma in the axis of oscillation A and the restoring moment Mb in the axis of rotation B are regarded as vectors commencing from the centre O, according to the parallelogram rule, equilibrium could only be obtained by adding a constraint moment Mz at right angles to the axis of rotation B. This constraint moment Mz, as can easily be seen, acts as a tensioning moment for the spring bar 8 in a vertical longitudinal plane. The spring bar 8 is therefore subjected mainly to torsional stresses due to the restoring moment $Mb$ and also to bending stresses due to the constraint moment $Mz$.

In the constructional example according to Figs. 3 and 4 the same fundamental arrangement is used. The ball 6 is however replaced by a rubber joint 15, which consists of a rubber sleeve subjected to parallel tension between two sleeves 15a, 15b. This rubber joint 15 allows of lateral movement of the end 8a of the spring bar up to the angle $\beta^1$. The spring bar end 8a is therefore constrained to move into the axis of oscillation A, whereby the spring bar 8 is rotated not about the theoretical axis of rotation B, but about a neighbouring effective axis of rotation B'. If moments are resolved bearing this in mind in such a manner that the restoring moment $Mb$ balances the bearing moment $Ma$ and the constraint moment $Mz$, the latter becomes very small. The spring bar 8 in this case is mainly subjected to torsion by the restoring moment $Mb$ and also to bending stresses by two constraint moments, one of which is determined by the tension of the rubber and the other by $Mz$ and which can act in plane at right angles.

The word "frame" as herein used is not to be understood as limited to such a device when formed separate from the body or coachwork of the vehicle, but as including such devices when formed integral with said body or coachwork.

Figure 6:
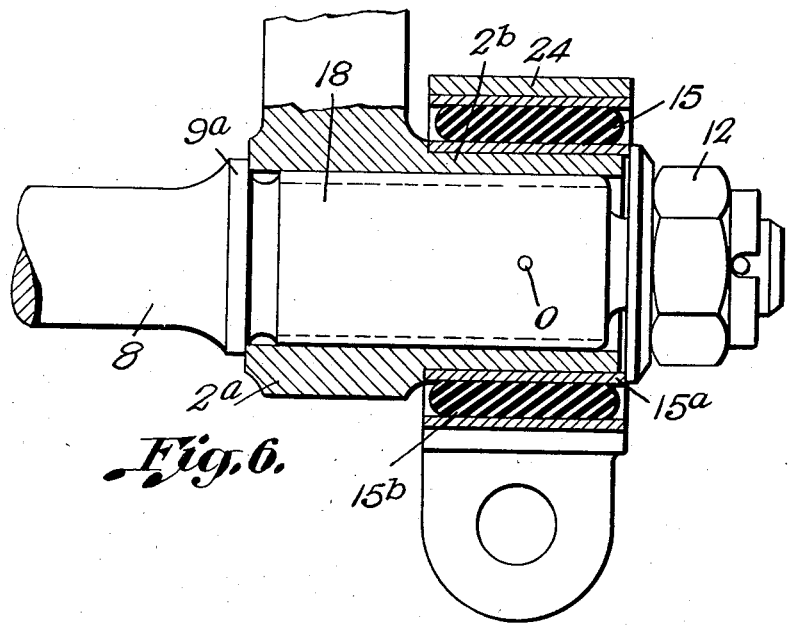

The invention is not restricted to the constructional examples shown in Figs. 1–4. The ball or the rubber joint as shown in Figs. 5 and 6, respectively can also be mounted on a tubular extension 2b of the strut in order to relieve the spring bar, especially when large bearing forces are operative. The spring bar can also be located transversely to the longitudinal central plane of the vehicle, for example when instead of having one central supporting member, the vehicle frame consists of two parallel longitudinal members and the swinging struts are mounted thereon, as in the case of the construction shown in Fig. 1 of application, Serial No. 712,588, filed Feb. 23, 1934. By this means the angle between the theoretical axis of oscillation of the wheels and the axis of rotation of the springs can be kept as small as possible so that the constraint moments are reduced to a minimum. Instead of the spring bars it is possible to use any known torsion springs, thus for example cylindrical helical springs, spiral springs or the like.

What I claim is:—

1. In a spring suspension system for vehicles, a road wheel, a swinging half axle on which said wheel is mounted, a swinging strut rigidly connected at one end to said half axle, a frame in which the swinging half axle is supported, a torsion spring supported by said frame, a firm connection between said torsion spring and the other end of said strut, and a bearing on said frame supporting the torsion spring adjacent said firm connection with freedom of movement in all directions.

2. In a spring suspension system for vehicles, a road wheel, a swinging half axle on which said wheel is mounted, a swinging strut rigidly connected at one end to said half axle, a frame in which the swinging half axle is supported, a torsion spring supported by said frame, a firm connection between said torsion spring and the other end of said strut, and a spherical bearing on said frame supporting the torsion spring adjacent said firm connection.

3. In a spring suspension system for vehicles, a road wheel, a swinging half axle on which said wheel is mounted, a swinging strut rigidly connected at one end to said half axle, a frame in which the swinging half axle is supported, a torsion spring supported by said frame, a firm connection between said torsion spring and the other end of said strut, and a rubber bearing on said frame supporting the torsion spring adjacent said firm connection with freedom of movement in all directions.

4. In a spring suspension system for vehicles, a road wheel, a swinging half axle on which said wheel is mounted, a swinging strut rigidly connected at one end to said half axle, a frame in which the swinging half axle is supported, a torsion spring supported by said frame, a firm connection between said torsion spring and the other end of said strut, and a bearing on said frame supporting the torsion spring adjacent said firm connection with freedom of movement in all directions, said bearing having a universal joint element mounted on the torsion spring at its free end.

5. In a spring suspension system for vehicles, a road wheel, a swinging half axle on which said wheel is mounted, a swinging strut rigidly connected at one end to said half axle, a frame in which the swinging half axle is supported, a torsion spring supported by said frame and having a journal pin at its other end, a firm connection between said torsion spring and the other end of said strut, and a bearing on said frame supporting the torsion spring adjacent said firm connection with freedom of movement in all directions, said bearing having a universal joint element mounted directly on the journal pin of the torsion spring.

6. Spring supporting means for vehicle chassis comprising a wheel supporting axle movably attached to said chassis for oscillation about a substantially fixed axis, rotary spring means connected to said axle for resiliently resisting the swinging thereof, and means for connecting said rotary spring means to said chassis including means permitting freedom of movement in more than two directions.

7. In a vehicle having a frame, in combination, an axle having a wheel mounted thereon, torsion bar spring means connected to said axle, and means for joining said spring means to said frame including means capable of movement in more than two directions.

8. In a vehicle having a frame, in combination, an axle having a wheel mounted thereon, spring means connected to said frame, means connecting said axle and said spring means, and means capable of movement in more than two directions for joining said connecting means to said frame.

9. The combination according to claim 8 in which said last means is a spherical joint.

10. The combination according to claim 8 in which said last means is a universal joint.

11. The combination according to claim 8 in which said last means is capable of movement in all directions.

12. The combination according to claim 8 in which said last means includes resilient material.

13. The combination according to claim 8 in which said last means includes rubber.

14. In a vehicle having a frame, in combination, an axle having a wheel mounted thereon, a member having a trunnion connected to said axle, means permitting freedom of movement in more than two directions for connecting said trunnion to said frame, and spring means connected to said frame and said trunnion.

15. The combination according to claim 14 in which the means connecting the trunnion to the frame is a universal joint.

16. The combination according to claim 14 in which the means connecting the trunnion to the frame permits freedom of movement in all directions.

17. The combination according to claim 14 in which the means connecting the trunnion to the frame includes resilient material.

18. The combination according to claim 14 in which the means connecting the trunnion to the frame includes rubber.

19. The combination according to claim 14 in which the spring means is a torsion bar.

20. In a spring suspension system for vehicles, a road wheel, a swinging half axle on which said wheel is mounted, a frame to which the swinging half axle is attached, spring means supported by said frame, means rigidly connecting one end of said half axle to said spring means, and means on said frame supporting the spring means adjacent said rigid connection with freedom of movement in more than two directions.

21. The combination according to claim 20 in which said last means is a spherical bearing.

22. The combination according to claim 20 in which said last means is a universal joint.

23. In a vehicle, a frame, a road wheel, means for supporting said road wheel relative to said frame comprising a member connected with said road wheel and pivoted to said frame for oscillation about an axis, and a torsion bar lying outside of said axis having one of its ends fixed relative to said frame and its other end journaled to said frame, said pivoted member being firmly attached to said bar intermediate its ends, and said bar being free to bend transversely intermediate its ends.

KARL RABE.